United States Patent
DuBois et al.

(10) Patent No.: US 9,183,516 B2
(45) Date of Patent: Nov. 10, 2015

(54) SYSTEMS AND METHODS FOR LOCATING AND PRIORITIZING CARGO

(71) Applicant: The Boeing Company, Seal Beach, CA (US)

(72) Inventors: Thomas A. DuBois, Media, PA (US); William Brendan Blanton, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 13/950,639

(22) Filed: Jul. 25, 2013

(65) Prior Publication Data

US 2015/0029044 A1   Jan. 29, 2015

(51) Int. Cl.
| | |
|---|---|
| G08B 21/00 | (2006.01) |
| G06Q 10/00 | (2012.01) |
| B64D 9/00 | (2006.01) |
| G01C 23/00 | (2006.01) |
| B64C 1/20 | (2006.01) |
| B64C 1/22 | (2006.01) |
| G06K 7/08 | (2006.01) |

(52) U.S. Cl.
CPC . *G06Q 10/00* (2013.01); *B64D 9/00* (2013.01)

(58) Field of Classification Search
USPC .................. 340/946; 705/35; 701/3
See application file for complete search history.

(56) References Cited

U.S. PATENT DOCUMENTS

| | | | |
|---|---|---|---|
| 6,940,994 B2 | 9/2005 | Nixon et al. | |
| 7,512,258 B2 | 3/2009 | Yelton et al. | |
| 7,693,617 B2 | 4/2010 | Dockter et al. | |
| 8,095,304 B2 | 1/2012 | Blanton et al. | |
| 8,622,298 B2 * | 1/2014 | Huber | ............ 235/451 |
| 2003/0101069 A1 * | 5/2003 | Sando | ................. 705/1 |
| 2005/0071258 A1 * | 3/2005 | Kumakawa | ........... 705/28 |
| 2006/0038077 A1 * | 2/2006 | Olin et al. | ........... 244/137.1 |

(Continued)

FOREIGN PATENT DOCUMENTS

| | | |
|---|---|---|
| EP | 1972896 A2 | 9/2008 |
| EP | 2180457 A1 | 4/2010 |
| JP | 2010066996 A | 3/2010 |

OTHER PUBLICATIONS

Combined Search and Examination Report of Application No. GB1411714.7; Jan. 19, 2015; 8 pages.

(Continued)

*Primary Examiner* — Jack K Wang
(74) *Attorney, Agent, or Firm* — Armstrong Teasdale LLP

(57) ABSTRACT

Methods and systems for use in locating and prioritizing cargo are provided. The system includes a communications unit configured to receive location information and content information for each of a plurality of pieces of cargo from a cargo location and classification sensor (CLCS). The system also includes a cargo pickup planner module configured to determine a priority listing of pieces of cargo based on mission information, the location information, and the content information. The system also includes a cargo approach planner module configured to transmit a set of waypoints for specified pieces of cargo selected from the priority listing to a control system (FCS) configured to maneuver a vehicle to a position above a specified piece of cargo. The system further includes a cargo pickup overlay generator module configured to generate an overlay for a pilotage system (PS) display to assist a user in maneuvering the vehicle above each piece of cargo for pickup.

18 Claims, 3 Drawing Sheets

(56) References Cited

U.S. PATENT DOCUMENTS

| | | |
|---|---|---|
| 2008/0078881 A1* | 4/2008 | Parras .................... 244/137.1 |
| 2009/0165890 A1 | 7/2009 | Komura et al. |
| 2010/0205019 A1 | 8/2010 | Jung et al. |
| 2010/0213313 A1* | 8/2010 | Reed et al. ................ 244/118.1 |
| 2012/0004793 A1 | 1/2012 | Block |
| 2013/0268191 A1* | 10/2013 | Telang et al. ................ 701/468 |

OTHER PUBLICATIONS

Dubois et al., System Concept for a Rotorcraft Vision System to Improve Cargo Handling Operations, American Helicopter Society, dated Jun. 1994, pp. 136-142.

* cited by examiner

SYSTEMS AND METHODS FOR LOCATING AND PRIORITIZING CARGO

BACKGROUND OF THE INVENTION

The implementations described herein relate generally to systems and methods for tracking cargo, and, more particularly, to systems and methods for locating and prioritizing cargo.

Each day, numerous amounts of cargo is picked-up, transported, and/or delivered to different destinations. Delivery of such cargo may be time-sensitive and may need to reach a recipient much more quickly than other cargo. In a military context, a supply aircraft may drop multiple pieces of cargo within a predefined area. A helicopter picks up the cargo and delivers it to specified ground locations. Cargo management systems exist that mark a general location of each piece of cargo. At least some known cargo management systems use human eyesight and/or standard night vision systems to assist pilots in finding cargo that was dropped into areas of foliage and/or other environmental obscurants. Such known systems are inefficient in locating cargo, resulting in increased danger to the pilot and crew. Additionally, known cargo management systems do not provide a method for the crew to identify the contents of each piece of cargo from the helicopter. Accordingly, it may be difficult to locate and identify time-sensitive cargo for delivery.

Moreover, at least some known helicopters use sling-load attachments for picking up and transporting cargo. Numerous safety issues exist with the use of sling-load attachments, including, proximity of the helicopter to the load itself and wires and/or branches that may be located between the current helicopter location to a point above the load where the cargo can be safely hooked. To couple the helicopter to the load, at least some known attachment systems include a crew member sticking his/her head through an opening in the floor of the helicopter and calling out verbal commands to the pilot for lowering the helicopter above the load. Such method is prone to communication error between the crew member and the pilot, and introduces the crew member to safety risks.

BRIEF DESCRIPTION OF THE INVENTION

In one aspect, a method is provided for use in locating and prioritizing cargo. The method includes receiving, by a processor, location information and content information for each of a plurality of pieces of cargo from a cargo location and classification sensor (CLCS). The method also includes determining a priority listing of pieces of cargo based on mission information, the location information, and the content information. The method also includes transmitting a set of waypoints for specified pieces of cargo selected from the priority listing to a control system (FCS) configured to maneuver a vehicle to a position above a specified piece of cargo. The method further includes generating an overlay for a pilotage system (PS) display to assist a user in maneuvering the vehicle above each piece of cargo for pickup.

In another aspect, a system is provided. The system includes a communications unit configured to receive location information and content information for each of a plurality of pieces of cargo from a cargo location and classification sensor (CLCS). The system also includes a cargo pickup planner module configured to determine a priority listing of pieces of cargo based on mission information, the location information, and the content information. The system also includes a cargo approach planner module configured to transmit a set of waypoints for specified pieces of cargo selected from the priority listing to a control system (FCS) configured to maneuver a vehicle to a position above a specified piece of cargo. The system further includes a cargo pickup overlay generator module configured to generate an overlay for a pilotage system (PS) display to assist a user in maneuvering the vehicle above each piece of cargo for pickup.

In yet another aspect, a computer-readable storage device is provided having encoded thereon computer readable instructions that are executable by a processor to perform functions including receiving location information and content information for each of a plurality of pieces of cargo from a cargo location and classification sensor (CLCS). The instructions are executable by the processor to perform functions further including determining a priority listing of pieces of cargo based on mission information, the location information, and the content information. The instructions are executable by the processor to perform functions further including transmitting a set of waypoints for specified pieces of cargo selected from the priority listing to a controls system (FCS) configured to maneuver the aircraft to a position above a specified piece of cargo. The instructions are executable by the processor to perform functions further including generating an overlay for a pilotage system (PS) display to assist a user in maneuvering the aircraft above each piece of cargo for pickup.

DETAILED DESCRIPTION OF THE INVENTION

Although described in connection with an exemplary military rotorcraft application, the implementations described herein are operational with numerous other general purpose or special purpose cargo transportation applications, environments, and/or configurations. Examples of well-known cargo transportation applications, environments, and/or configurations that may be suitable for use with aspects of the disclosure include, but are not limited to, humanitarian applications, the logging industry, the train industry, and/or the ship industry.

As used herein, the term "vehicle" will be primarily described hereinafter as a rotorcraft or other airborne vehicle. In this regard, and as particularly advantageous in conjunction with the delivery of cargo in the context of an ad-hoc military operation, vehicles that are capable of vertical take-off and landing, such as rotorcrafts, helicopters, and/or vehicles capable of relatively short takeoffs and landing, particularly on less conventional airstrips, can advantageously serve as the vehicles. In other context, however, other types of vehicles may be employed.

Figure 1:
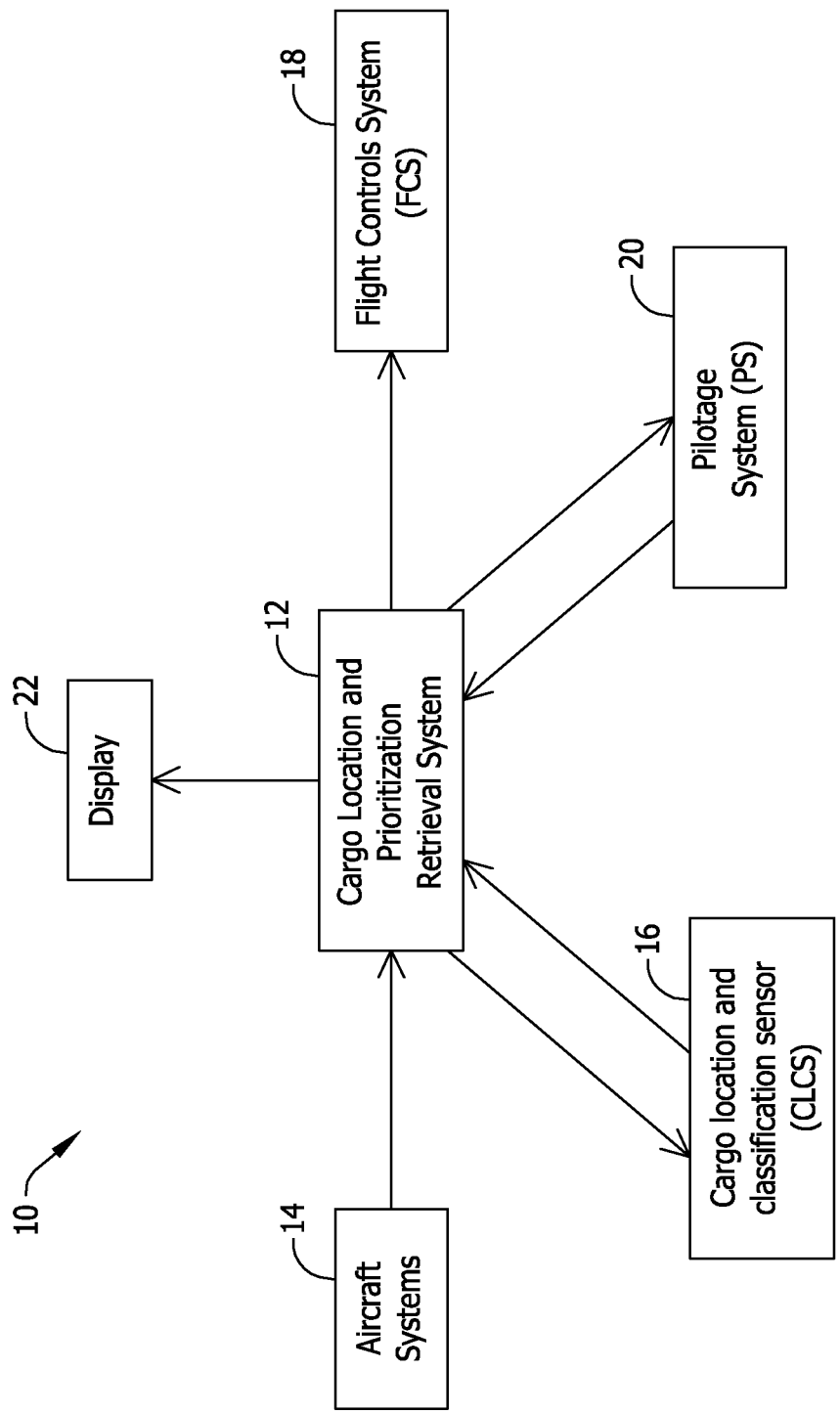
FIG. 1 is a block diagram of a cargo management system.

FIG. 1 is a block diagram of a cargo management system 10. In the exemplary implementation, cargo management system 10 includes a cargo location and prioritization retrieval system (CLAPRS) 12 configured to locate, identify, and prioritize retrieval of cargo spread out over a predetermined area. Cargo management system 10 also includes aircraft information systems 14, a cargo location and classification sensor (CLCS) 16, a controls system (FCS) 18, and a pilotage system (PS) 20. In the exemplary implementation, CLAPRS 12 is communicatively coupled to each of aircraft information systems 14, CLCS 16, FCS 18, and PS 20.

Aircraft information systems 14 include various systems onboard a rotorcraft that track flight data. More specifically, in the exemplary implementation, aircraft information systems 14 provide information including on-ship position, map data, cargo data, GPS data, and controls information. CLAPRS 12 communicates with aircraft information systems 14 to receive information about the rotorcraft.

In the exemplary implementation, CLCS 16 is configured to locate and identify pieces of cargo upon receiving a scanning command from CLAPRS 12. In the exemplary implementation, CLCS 16 is a polarizing laser radar that is configured to simultaneously locate in 3D space and classify cargo. Alternatively, CLCS 16 may include stereo camera pairs, LiDAR, Laser ranging, millimeter wave radar, and/or any sensor that enables cargo management system 10 to function as described herein. CLCS 16 scans the area in search of cargo. When a piece of cargo is located, CLCS 16 interrogates reflectors disposed on the cargo to determine the contents of the cargo. CLCS 16 then transmits cargo location and content information to CLAPRS 12. Alternatively, the cargo may have any type of known electronic identification tag, for example, a barcode tag or a radio frequency identification tag. In an alternative implementation, CLCS 16 may be any type of scanning device that enables cargo management system 10 to function as described herein.

In the exemplary implementation, CLAPRS 12 transmits a list of waypoints representing locations of the cargo to FCS 18. If authorized by the pilot, FCS 18 controls flight of the rotorcraft in an autopilot mode and flies the rotorcraft to each waypoint specified by CLAPRS 12. More specifically, FCS 18 is configured to maneuver the rotorcraft to a position above a specified piece of cargo.

Once the rotorcraft reaches a specified piece of cargo, the rotorcraft exits autopilot mode and enters "pickup" mode. CLAPRS 12 transmits a signal to PS 20 to cause PS 20 to enter pickup mode. PS 20 is configured to provide visual situational awareness to a pilot in low-visibility conditions, for example, brownouts in sandy areas or whiteouts in snowy areas. PS 20 transmits a video to CLAPRS 12 that displays attachment operations of the rotorcraft. The pilot may watch such operations on a display 22.

Figure 2:
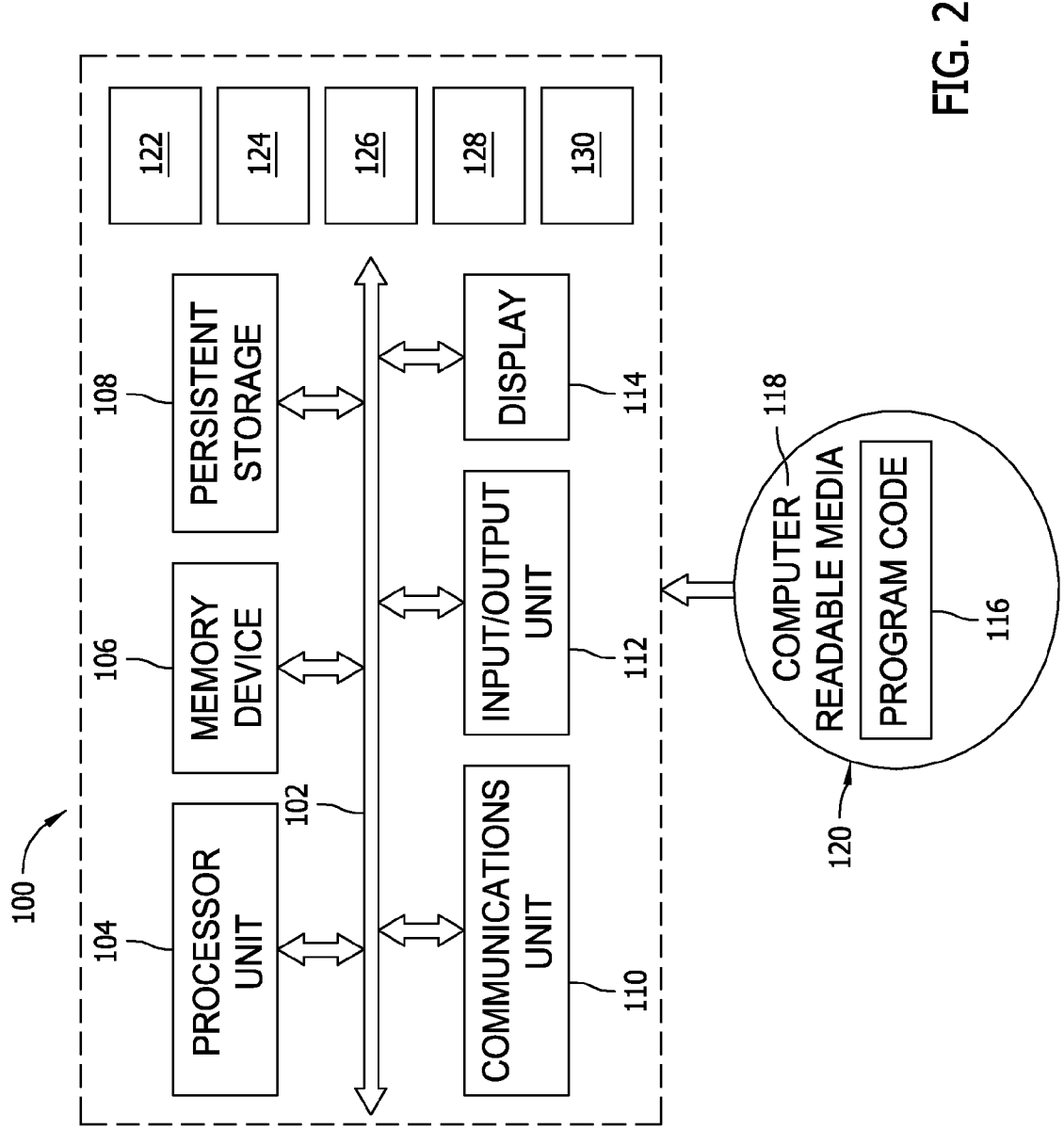
FIG. 2 is a block diagram of an exemplary computing device that may be used to locate, identify, and prioritize retrieval of cargo.

FIG. 2 is a block diagram of an exemplary computing device 100 that may be used to locate, identify, and prioritize retrieval of cargo, for example, CLAPRS 12. In the exemplary implementation, computing device 100 includes a communications fabric 102 that enables communication between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying information to a user.

Processor unit 104 executes instructions for software that may be loaded into memory 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another implementation, processor unit 104 may be a homogeneous processor system containing multiple processors of the same type.

Memory 106 and persistent storage 108 are examples of storage devices. A storage device may be any piece of hardware that is capable of storing information either on a temporary basis and/or a permanent basis. Memory 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory 106 and/or persistent storage 108, may be configured to store data for use with the processes described herein. For example, a storage device may store computer-executable instructions, executable software components (e.g., communications components, threat determination components, threat relevancy components, threat prioritization components, and threat evaluation components), data received from data sources, aircraft information, hardware and/or software component information, business descriptions associated with hardware and/or software components, safety information hardware and/or software components, threat tree models, and/or any other information suitable for use with the methods described herein.

Communications unit 110, in these examples, enables communications with other computing devices or systems. In the exemplary implementation, communications unit 110 is a network interface card. Communications unit 110 may provide communications through the use of either or both physical and wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory 106 for execution by processor unit 104. The processes of the different implementations may be performed by processor unit 104 using computer implemented instructions and/or computer-executable instructions, which may be located in a memory, such as memory 106. These instructions are referred to herein as program code (e.g., object code and/or source code) that may be read and executed by a processor in processor unit 104. The program code in the different implementations may be embodied on different physical or tangible computer readable media, such as memory 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative implementations, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include an event processor component, a complex event processing component, a machine learning component, a decision support component, and/or any component suitable for the methods described herein. Each component may include computer-executable instructions that, when executed by processor unit 104, cause processor unit 104 to perform one or more of the operations described herein.

The different components illustrated herein for computing device 100 are not architectural limitations to the manner in which different implementations may be implemented. Rather, the different illustrative implementations may be implemented in a computer system including components in addition to or in place of those illustrated for computing device 100. For example, other components shown in FIG. 2 can be varied from the illustrative examples shown.

In one example, a storage device in computing device 100 is any hardware apparatus that may store data. Memory 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

In the exemplary implementation, computing device 100 includes at least a laser radar scan planner module 122, a cargo pickup planner module 124, a cargo approach planner module 126, a cargo pickup overlay generator module 128, and a video overlay merge module 130. Modules 122, 124, 126, 128, and/or 130 may be in the form of any combination of software and/or hardware.

Figure 3:
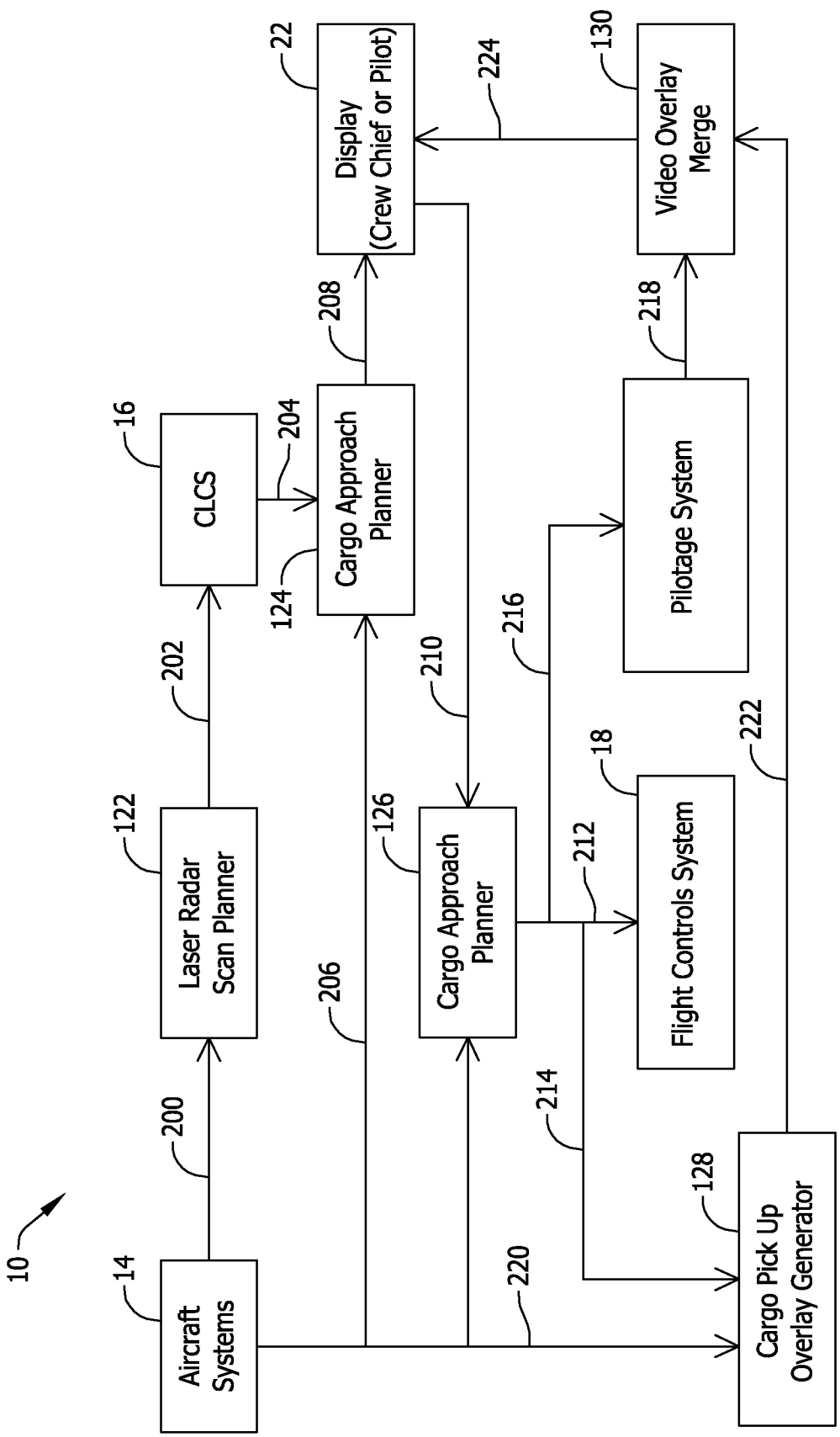
FIG. 3 is a functional block diagram of the cargo management system shown in FIG. 1 that includes the cargo location and prioritization retrieval system (CLAPRS) shown in FIGS. 1 and 2.

FIG. 3 is a functional block diagram of cargo management system 10 (shown in FIG. 1) that includes CLAPRS 12 (shown in FIGS. 1 and 2). In the exemplary implementation, a plurality of pieces of cargo are delivered or dropped at a predetermined location. In a military context, the cargo is dropped by a low flying supply plane at a drop-off area. The supply plane records global positioning system (GPS) coordinates and transmits them to a delivery vehicle, for example, a rotorcraft.

The rotorcraft approaches the drop-off area using information from aircraft information systems 14 (shown in FIG. 1), for example, a GPS, to locate the GPS coordinates 200 supplied by the supply plane. When the rotorcraft position is within a predetermined tactical radius of the drop-off area, a CLAPRS 12 activation option is cued to the pilot. For example, in the exemplary implementation, the activation option of CLAPRS 12 is cued when the rotorcraft is within approximately 1 kilometer of the drop-off area.

If the pilot approves CLAPRS 12 request for operation, laser radar scan planner module 122 determines and transmits scan commands 202 to CLCS 16 (shown in FIG. 1). If it is the first scan using CLCS 16, then laser radar scan planner module 122 uses the rotorcraft and cargo drop-off positions to calculate a Field-Of-Regard (FOR) for CLCS 16, and sends the FOR to CLCS 16. CLCS 16 returns a 3D map of the FOR with "coding" that represents differences in material properties. If it is not the first scan of CLCS 16, laser radar scan planner module 122 recalculates the FOR as described above, and adds additional small FORs for potential targets found on the 3D CLCS 16 map. If a reflector return is detected on any of the scans, CLCS 16 refers to a look-up table and assigns contents to cargo. CLCS 16 provides location information and content information 204 (if available) for each piece of cargo to cargo pickup planner module 124.

Cargo pickup planner module 124 references mission data and uses CLCS data to generate a priority listing of cargo for pickup. More specifically, in the exemplary implementation, cargo pickup planner module 124 references an initial listing of cargo destinations and priorities 206, and CLCS 16 location and content information 204. In the exemplary implementation, initial listing of cargo destinations and priorities 206 is stored in aircraft information systems 14 as cargo data. To create the priority listing of cargo 208, cargo pickup planner module 124 executes a Figure-Of-Merit calculation on the list of locations and contents of cargo provided by CLCS 16. Cargo pickup planner module 124 then reorders the list based on that calculation. Factors in the calculation include relevance of cargo contents (if known) to mission priority, ability to safely pick up the cargo (e.g., threats from obstacles and known enemy locations), and a maximization calculation of most cargo to be delivered given delivery locations and available range. Cargo pickup planner module 124 then transmits the priority cargo listing to the pilot for pilot selection via display 22 (shown in FIG. 1).

The pilot selects at least one piece of cargo 210 from the priority listing. The pilot has the option of accepting the priority listing as provided, selecting any number of pieces of cargo from the priority listing, rejecting the priority listing, or manually overriding the listing. Cargo approach planner module 126 determines a set of waypoints 212 to be followed for approaching a position above a selected piece of cargo. Cargo approach planner module 126 also determines the safest and most survivable route from the current position to a safe point directly above the selected cargo. The pilot reviews waypoints 212, and if satisfactory, authorizes them to be sent to FCS 18. Cargo approach planner module 126 then transmits a position trigger altitude target signal 214 and FCS 18 initiates autopilot mode and maneuvers rotorcraft to a position over the selected piece of cargo.

When the rotorcraft is in position over the cargo and the pilot has given authorization, CLAPRS 12 sends a cargo pickup mode trigger signal 216 to PS 20 to switch to cargo pickup mode. PS 20 generates a display video 218 and aligns the FOR directly below the center of the piece of cargo. Cargo pickup overlay generator module 128 uses aircraft information 220, for example, altitude, received from aircraft information systems 14 to generate an overlay 222 for PS display to assist the pilot maneuvering the rotorcraft above each piece of cargo for pickup. More specifically, cargo pickup overlay generator module 128 generates overlay 222 to assist the rotorcraft in reducing hover altitude of the rotorcraft to a proper position above the piece of cargo.

Video overlay merge module 130 merges and aligns the PS video with the CLAPRS overlays and sends the overlaid video 224 to the crew system displays. The crew chief attaches the cargo to the rotorcraft while the pilot (or copilot) watches the operation on the PS display.

While described herein as retrieving cargo, cargo management system 10 is not limited to this use. In some implementations, cargo management system 10 may be used to locate and prioritize delivery and/or supply of cargo.

The implementations described herein facilitate locating cargo that has been dropped from a fixed wing aircraft meant for helicopter pickup and delivery to those that need the load contents. The implementations described herein also increase the likelihood that important time-critical cargo gets to its intended destination in a timely fashion. Furthermore, the implementations described herein increase the safety of sling load pickup operations as compared to known methods.

A technical effect of the systems and methods described herein includes at least one of: (a) receiving location information and content information for each of the plurality of pieces of cargo from a cargo location and classification sensor (CLCS); (b) determining a priority listing of pieces of cargo based on mission information, the location information, and the content information; (c) transmitting a set of waypoints for specified pieces of cargo selected from the priority listing to a controls system (FCS) configured to maneuver the rotorcraft to a position above a specified piece of cargo; and (d) generating an overlay for a (DVE) display to assist a user in maneuvering the rotorcraft above each piece of cargo for pickup.

Exemplary implementations of a risk management system for use with service agreements are described above in detail. The methods and systems are not limited to the specific implementations described herein, but rather, components of systems and/or steps of the methods may be utilized independently and separately from other components and/or steps described herein. For example, the methods may also be used in combination with other systems and methods, and are not limited to practice with only the cargo management systems and methods as described herein. Rather, the exemplary implementation can be implemented and utilized in connection with many other warranty and/or service agreements and/or deals.

Implementations described herein may be performed using a computer-based or computing-device-based operating environment as described below. A computer or computing device may include one or more processors or processing units, system memory, and some form of non-transitory computer-readable media. Exemplary non-transitory computer-readable media include flash memory drives, hard disk drives, digital versatile discs (DVDs), compact discs (CDs), floppy disks, and tape cassettes. By way of example and not limitation, computer-readable media comprise computer storage media and communication media. Computer-readable storage media are non-transitory and store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, implementations described herein are operational with numerous other general purpose or special purpose computing system environments or configurations. Examples of known computing systems, environments, and/or configurations that may be suitable for use with other aspects include, but are not limited to, mobile computing devices, personal computers, server computers, handheld or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Implementations may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the implementations may be implemented with any number and organization of such components or modules. For example, the aspects are not limited to the specific computer-executable instructions or the specific components or modules illustrated in the figures and described herein. Other implementations may include different computer-executable instructions or components having more or less functionality than illustrated and described herein.

Aspects of the invention transform a general-purpose computer into a special-purpose computing device when configured to execute the instructions described herein.

Although specific features of various implementations may be shown in some drawings and not in others, this is for convenience only. In accordance with the principles of the implementations, any feature of a drawing may be referenced and/or claimed in combination with any feature of any other drawing.

This written description uses examples to disclose the implementations, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of locating and prioritizing cargo, said method comprising:
receiving, by a processor, location information and content information for each of a plurality of pieces of cargo from a cargo location and classification sensor (CLCS);
determining a priority listing of pieces of cargo based on mission information, the location information, and the content information;
transmitting a set of waypoints for specified pieces of cargo selected from the priority listing to a control system (FCS) configured to maneuver a vehicle to a position above a specified piece of cargo;
generating an overlay for a pilotage system (PS) display to assist a pilot in maneuvering the vehicle above each piece of cargo for pickup; and
merging the overlay and the PS display, wherein the PS display displays a video of the pieces of cargo taken from the vehicle positioned above each piece of cargo.

2. A method in accordance with claim 1, further comprising receiving global positioning system (GPS) coordinates associated with the plurality of pieces of cargo.

3. A method in accordance with claim 1, further comprising transmitting a scan signal to the CLCS, the scan signal including scan instructions for execution by the CLCS.

4. A method in accordance with claim 1, further comprising transmitting the priority listing of pieces of cargo to a user display.

5. A method in accordance with claim 4, further comprising receiving specified pieces of cargo selected by a user from the priority listing of pieces of cargo.

6. A method in accordance with claim 1, further comprising using vehicle information to generate the overlay to assist the pilot in adjusting hover altitude of the vehicle to a proper altitude above a piece of cargo.

7. A system comprising:
a communications unit configured to receive location information and content information for each of a plurality of pieces of cargo from a cargo location and classification sensor (CLCS);
a cargo pickup planner module configured to determine a priority listing of pieces of cargo based on mission information, the location information, and the content information;
a cargo approach planner module configured to transmit a set of waypoints for specified pieces of cargo selected from the priority listing to a control system (FCS) configured to maneuver a vehicle to a position above a specified piece of cargo;
a cargo pickup overlay generator module configured to generate an overlay for a pilotage system (PS) display to assist a pilot in maneuvering the vehicle above each piece of cargo for pickup; and
a video overlay merge module configured to merge the overlay and the PS display, wherein the PS display displays a video of the pieces of cargo taken from the vehicle positioned above each piece of cargo.

8. A system in accordance with claim 7, wherein said communications unit is further configured to receive global positioning system (GPS) coordinates associated with the plurality of pieces of cargo.

9. A system in accordance with claim 7, further comprising a laser radar scan planner module configured to transmit a scan signal to the CLCS, the scan signal including scan instructions for execution by the CLCS.

10. A system in accordance with claim 7, wherein said cargo pickup planner module is further configured to transmit the priority listing of pieces of cargo to a user display.

11. A system in accordance with claim 10, wherein said communications unit is further configured to receive specified pieces of cargo selected by a user from the priority listing of pieces of cargo.

12. A system in accordance with claim 7, wherein said communications unit is further configured to use vehicle information to generate the overlay to assist the pilot in adjusting hover altitude of the vehicle to a proper altitude above a piece of cargo.

13. A system in accordance with claim 7, wherein said video overlay merge module is further configured to transmit the merged overlay and the PS display to a user display.

14. A non-transitory computer-readable storage device having encoded thereon computer readable instructions that are executable by a processor to perform functions comprising:
receiving location information and content information for each of a plurality of pieces of cargo from a cargo location and classification sensor (CLCS);
determining a priority listing of pieces of cargo based on mission information, the location information, and the content information;
transmitting a set of waypoints for specified pieces of cargo selected from the priority listing to a controls system (FCS) configured to maneuver a vehicle to a position above a specified piece of cargo;
generating an overlay for a pilotage system (PS) display to assist a pilot in maneuvering the vehicle above each piece of cargo for pickup; and
merging the overlay and the PS display, wherein the PS display displays a video of the pieces of cargo taken from the vehicle positioned above each piece of cargo.

15. A non-transitory computer-readable storage device in accordance with claim 14, wherein the instructions are executable by the processor to perform functions comprising transmitting a scan signal to the CLCS, the scan signal including scan instructions for execution by the CLCS.

16. A non-transitory computer-readable storage device in accordance with claim 14, wherein the instructions are executable by the processor to perform functions comprising:
transmitting the priority listing of pieces of cargo to a user display; and
receiving specified pieces of cargo selected by a user from the priority listing of pieces of cargo.

17. A non-transitory computer-readable storage device in accordance with claim 14, wherein the instructions are executable by the processor to perform functions comprising using vehicle information to generate the overlay to assist the pilot in adjusting hover altitude of the vehicle to a proper altitude above a piece of cargo.

18. A non-transitory computer-readable storage device in accordance with claim 14, wherein the instructions are executable by the processor to perform functions comprising:
transmitting the merged overlay and the PS display to a user display.

* * * * *